United States Patent [19]
Long, Jr.

[11] Patent Number: 5,064,037
[45] Date of Patent: Nov. 12, 1991

[54] ONE-WAY ACTING SPRAG CLUTCH WITH CENTRIFUGAL DISENGAGEMENT FROM THE OUTER RACE

[76] Inventor: Thomas F. Long, Jr., 15127 Windmill Pointe Dr., Grosse Pointe Park, Mich. 48230

[21] Appl. No.: 486,793

[22] Filed: Mar. 1, 1990

[51] Int. Cl.$^5$ .................... F16D 41/07; F16D 43/14
[52] U.S. Cl. .................... 192/41 A; 192/45.1; 192/104 B
[58] Field of Search ............ 192/41 A, 45.1, 103 B, 192/104 R, 104 B, 104 C; 188/82.8

[56] References Cited

U.S. PATENT DOCUMENTS

| | | | |
|---|---|---|---|
| 2,477,176 | 7/1949 | Gruenberg et al. | 192/45.1 |
| 2,881,886 | 4/1959 | Troendly et al. | 192/45.1 |
| 3,302,761 | 2/1967 | Zlotek | 192/45.1 |
| 3,545,581 | 12/1970 | Kent | 192/45.1 |
| 3,702,649 | 11/1972 | Giese et al. | 192/41 A |
| 3,844,391 | 10/1974 | Hallerberg | 192/41 A |
| 4,360,093 | 11/1982 | Wakabayashi et al. | 192/41 A |
| 4,867,292 | 9/1989 | Hartig | 192/41 A |

FOREIGN PATENT DOCUMENTS 519199  12/1955  Canada .................... 192/45.1

OTHER PUBLICATIONS

Stovicek, D. R. "New Backstop Clutch Line." *Power Transmission Design* (Feb. 1987), pp. 22-23.

*Primary Examiner*—Richard Lorence
*Attorney, Agent, or Firm*—John R. Benefiel

[57] ABSTRACT

A one way acting sprag clutch is disclosed of the type automatically disengaging the sprags from an outer raceway at a predetermined rotative speed of the inner raceway to reduce wear during overrunning, in which the sprags are of an upright shape and are formed with a rocker portion having asymmetric rocker lip portions creating an unbalanced mass. The unbalanced mass causes increased tilting movements of the sprags overcoming the energizing force of the springs at the predetermined rotative speed of the inner raceway and liftoff of the outer end of the sprags from the outer raceway. The upright shape allows a complete complement of sprags to be employed to achieve high torque capacity. The rocker lip portions have abutment surfaces facing the adjacent sprags, which surfaces move into abutment when the sprags move to an overloaded wedging condition to provide an antirollover feature.

4 Claims, 4 Drawing Sheets

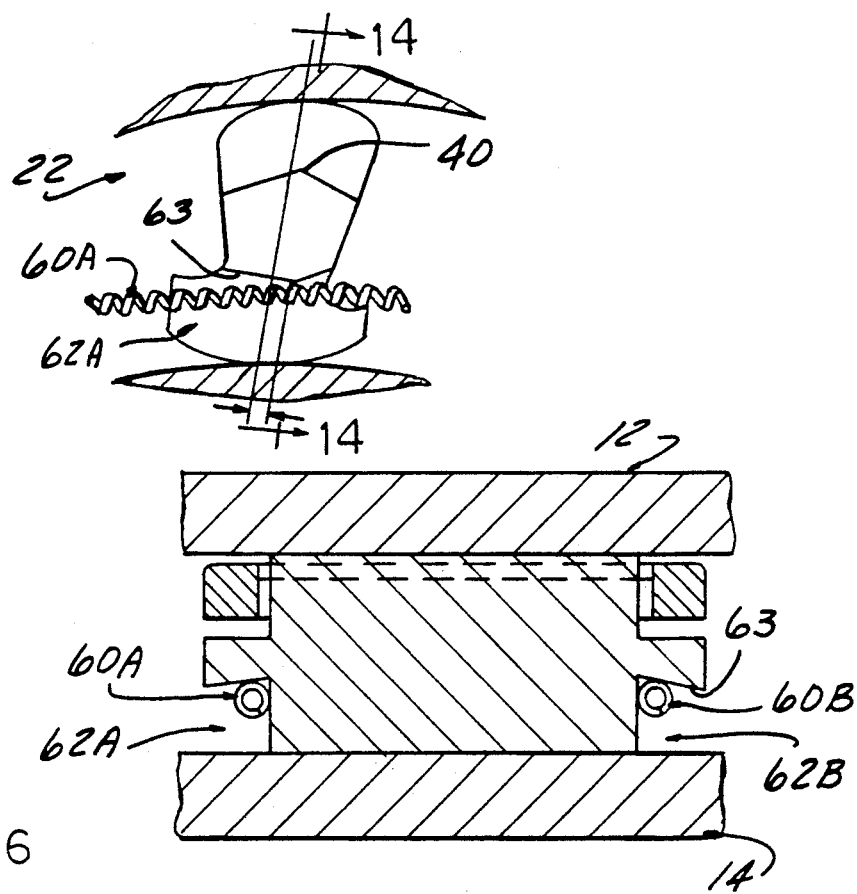
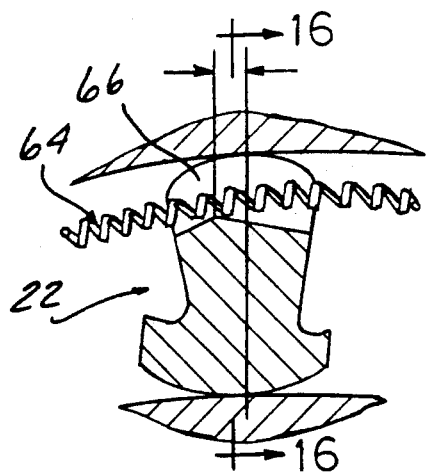
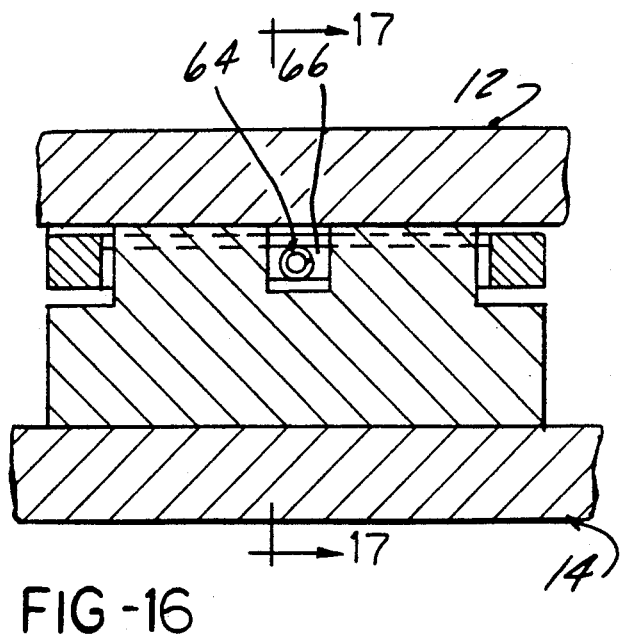
FIG-15
FIG-14
FIG-17
FIG-16

ONE-WAY ACTING SPRAG CLUTCH WITH CENTRIFUGAL DISENGAGEMENT FROM THE OUTER RACE

This invention concerns one way acting sprag clutches and more particularly sprag clutches of the type in which there is a centrifugally activated disengagement of the sprags during overrunning with an outer race.

In U.S. Pat. No. 3,702,649, issued on Nov. 14, 1972 for a "One Way Clutch Having Tiltable Sprags", there is disclosed a one way clutch in which each of the sprags have portions engaged with a rim on a cage so as to be tilted to move the outer surface of the sprag away from the outer race when a predetermined centrifugal speed is achieved. This design has the advantage of minimizing wear on the sprags and race during overrunning, but the relatively large size of the sprags employed in a circumferential direction reduces the number of sprags and thus the load carrying capacity of the clutch.

There have also heretofore been developed sprag clutches in which an "antirollover" feature is incorporated. That feature involves formations on adjacent sprags which abut during lock up, preventing the sprags from being cammed over during heavy loading, preventing such failure. This feature is described in U.S. Pat. No. 3,302,761 issued on Feb. 7, 1967 for a "Sprag Lock Retainer Assembly".

It would be advantageous if this feature could b incorporated into a centrifugally disengaged sprag clutch design.

SUMMARY OF THE INVENTION

The present invention provides a sprag clutch having an outer race engagement which is centrifugally disengaged, with relatively narrow sprags, such that a large complement of sprags may be fit into the device, enabling a relatively high torque capacity. This narrow width is achieved by utilizing a particular upright shape of the sprags, featuring a lower asymmetric rocker portion extending circumferentially. The bottom curved rocker feature has a large and a small protuberance on respective sides of the sprag, creating an unbalanced mass such that centrifugal force tends to tip the sprag causing rolling on the curved upper end of the sprag and the curved bottom of the rocker to tip the sprag in a clockwise direction. This tipping brings projections on the sprag into engagement with the rims of a retainer cage, a fulcrum for further tipping provided by a knife edge formed on each of the projections on either side of the sprag. The knife edges engaging the rims on the retainer cage hold the sprags radially in as the tipping of the sprags shortens their height and moves the outer end thereof out of engagement with the outer race at a predetermined overrunning speed of rotation.

The sprags are engaged with the outer race by rotation in the opposite direction from which overrunning occurs, the tipping of the sprags on the curved rocker surface increasing their height and wedging the sprags between both races. In an overload condition, the smaller rocker protuberance moves against an end face of the next adjacent larger rocker protuberance to provide an anti-rollover feature, preventing the sprag from rolling over and causing clutch failure.

DESCRIPTION OF THE DRAWINGS

FIG. 14 is a transverse sectional view of a sprag taken along the line 14—14 in FIG. 15, showing the engagement of a compressed garter spring energizing alternative arrangement.

FIG. 15 is a transverse sectional view through a sprag taken along the section line 4—4 of FIG. 6, but showing a stretched garter spring sprag energizing alternative.

FIG. 16 is a radial sectional view taken along the section line 16—16 in FIG. 17 through the sprag shown in FIG. 17.

FIG. 17 is a transverse section taken along the section line 17—17 in FIG. 16.

DETAILED DESCRIPTION

Figure 3:
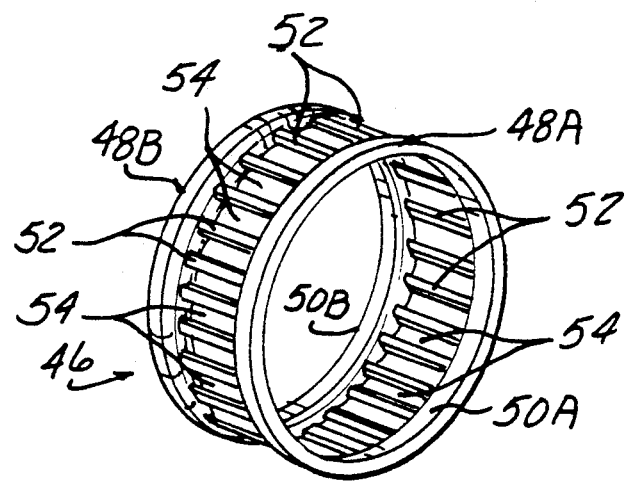
FIG. 3 is a perspective view of a retainer cage incorporated in the sprag clutch shown in FIG. 2.
Figure 1:
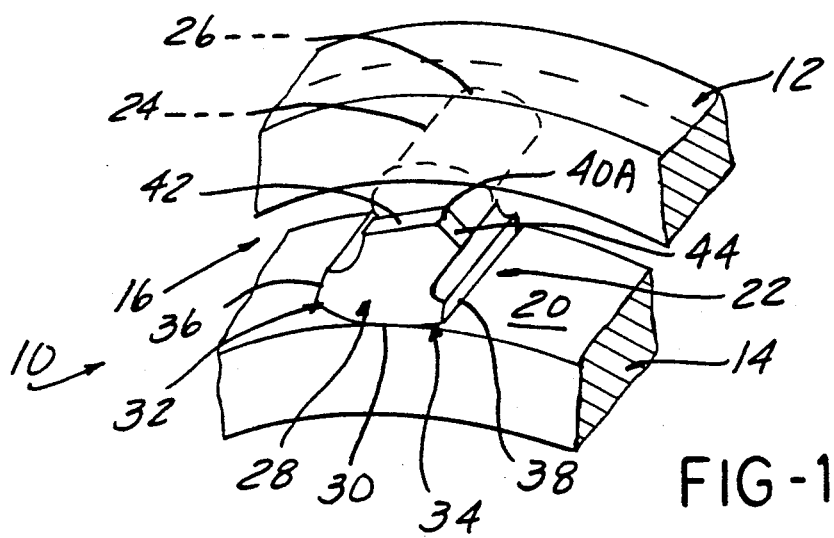
FIG. 1 is a fragmentary perspective view of a single sprag of a shape according to the present invention interposed between inner and outer races.
Figure 2:
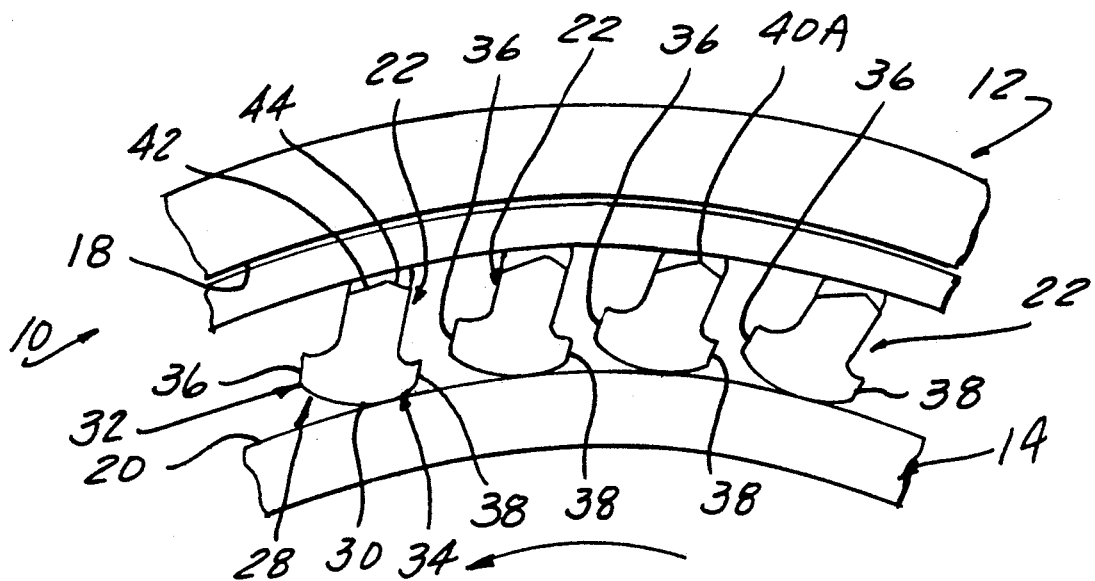
FIG. 2 is an enlarged fragmentary endwise view of a sprag clutch according to the present invention in a loaded condition.

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

Referring to the drawings, and particularly FIGS. 1-5 the sprag clutch 10 according to the present invention is particularly contemplated for an application where an outer race member 12 is held stationary, or is rotating at low speed with an inner race member 14 supported for rotation therein, as by suitable bearings (not shown).

There is a circumferentially extending annular space 16 lying between an outer raceway 18 formed within the outer race member and an inner raceway 20 formed on the outer diameter of the inner race member 14.

A complement of specially shaped sprags 22 ar disposed in the annular space 16, only a single sprag shown for illustrative purposes. According to the concept of the present invention, the sprags 22 are of an upright shape; that is, having their major dimension extending in a radial rather than a circumferential direction.

The upper or outer end 24 of each sprag has a curved surface 26 while the lower or inner end comprises a relatively wider rocker 28 also having a curved inside surface 30 extending the full axial depth of the sprag 22. The rocker 28 has a pair of circumferentially extending protuberances or lips 32 and 34 protruding in opposite directions from the main body of the sprag 22. The lips 32 and 34 are asymmetrically sized as to their radial depth, rocker lip 32, lying on the leading side of the sprag 22, being much thicker than rocker lip 34 of the trailing side of the sprag 22. This configuration creates a circumferentially unbalanced mass on the leading side of the sprag at the lower or inner side thereof subject to the influence of centrifugal force generated by rotation of the inner race member 14.

Lips 32 and 34 are each flattened in a generally radial plane to create respective flat abutment surfaces 36, 38 at the terminus thereof, these surfaces facing the opposite abutment surface on the next leading and trailing sprags 22 in the series extending around circumferential space 16.

Each side of sprag 22 is relieved from the outer end to form a pair of knife edge shoulder features 40A, 40B (FIGS. 4,5) projecting axially from the center of each sprag 22.

Sloping surfaces 42, 44 lie adjacent to each knife edge feature 40A, 40B, defining the high point comprising each knife edge.

Also included in the sprag clutch 10 is a generally cylindrical cage retainer 46 occupying a large part of the annular space 16, having a pair of annular rims 48A, 48B.

Figure 6:
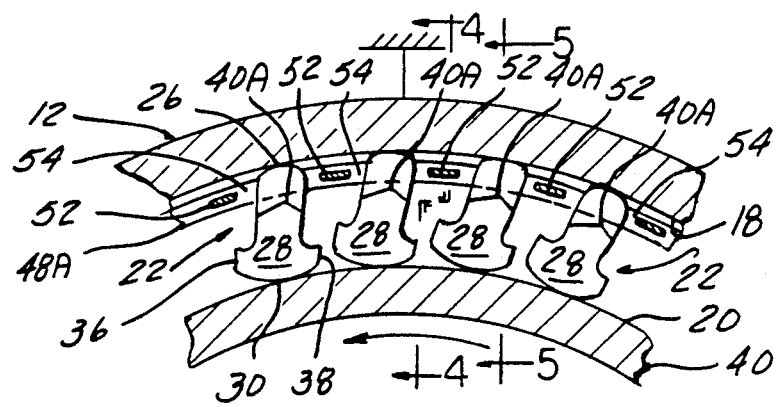
FIG. 6 is a fragmentary sectional view of the sprag clutch shown in FIG. 2, taken along the section line 6—6 in FIG. 5 with the sprags in a low speed overrunning condition.

Each rim 48A, 48B terminates in a respective circumferential surface 50A, 50B overlying a respective knife edge feature 40A, 40B with a slight clearance therebetween when the sprags 22 are in their rear tilting low speed overrunning condition shown in FIG. 6.

The configuration of each sprag curved surface 26 and 30 is such that at low speeds of inner race member 14, the sprags 22 tilt back with the effective intermediate height of the sprags 22 allowing a running fit, surface 26 sliding over the raceway surface 18 of the outer race member 12.

The rims 48A, 48B are connected by spacer bars 52 defining a circumferential series of spaces 54. Each space 54 receives the upper or outer portion of a respective sprag 22, as best seen in FIG. 6, the retainer cage 46 serving to keep the series of sprags 22 evenly distributed through the circumferential space 16.

At a predetermined relatively low rotative speed of the inner race member 14, centrifugal force increases to a point where the unbalanced mass created by the asymmetric size of the lips 32, 34 causes the sprags to rock about the curved surface 26 of rocker portion 28 in the direction of greater inclination.

The shape of curved surface 26 of the outer end of each sprag 22 is such as to relatively move the knife edge feature 40A, 40B outward slightly to bring these features into contact with the surface 50A, 50B respectively.

Figure 7:
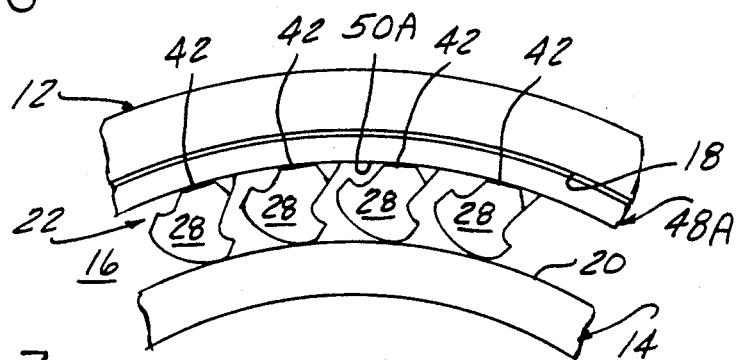
FIG. 7 is a fragmentary endwise view of the clutch shown in FIG. 2 the sprags in a high speed overrunning, outer race disengaged condition.
Figure 8:
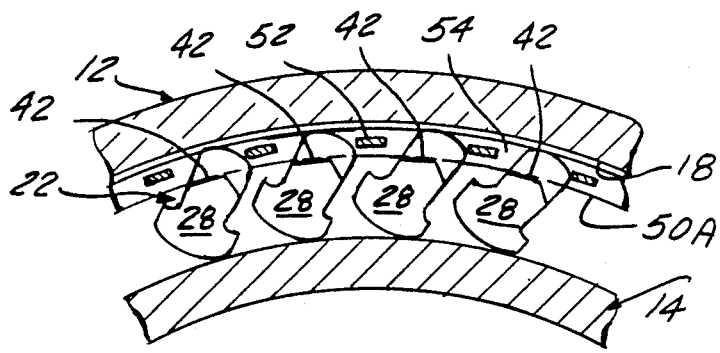
FIG. 8 is a fragmentary sectional view of the sprag clutch shown in FIG. 7 taken along the same section line 6—6 of FIG. 5, but with the sprags in an overrunning, outer race disengaged condition.

At the same point the curvature of the outer curved surface 26 falls off, reducing the effective height of each sprag 22 with this increased tilting, so that a clearance develops between the outer raceway 18 and sprags 22 as shown in FIG. 7, the rim surfaces 50A, 50B serving to restrain the sprags radially. The sprags 22 tilt to move the leading inclined surfaces 42 against the surface 50A, 50B, to thus hold the sprags 22 out of running contact with outer raceway 18 at this predetermined threshold rotative speed of the inner race member 14.

Figure 13:
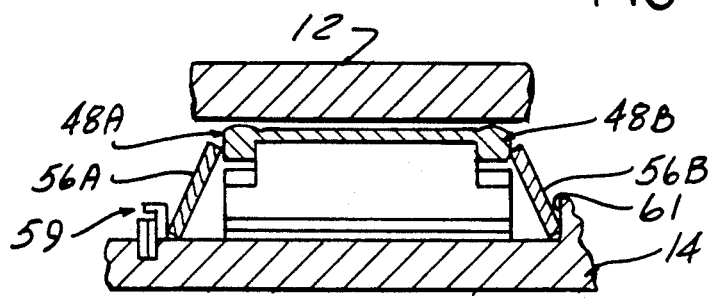
FIG. 13 is a transverse sectional view of a sprag clutch to the present invention, taken along the section line 4—4 in FIG. 6, but showing an alternative belleville spring washer arrangement for creating a frictional drive of the cage retainer by the clutch inner race.

It is noted that the cage retainer 46 should rotate with the inner race member 14, and thus Belleville springs 56A and 56B may be utilized, as shown in FIG. 13, mounted against a snap retainer 59 and a shoulder 61 respectively and exerting a frictional engagement with the side of a respective rim 48A, 48B, all as shown in FIG. 13.

The geometry of the sprags shown also provides the antirollover feature described above, as shown in FIGS. 9 and 10.

As inner race member 14 comes to a stop or zero relative velocity with respect to member 12 if both are rotating and attempts to reverse its direction of rotation, the sprags 22 roll slightly about the curved surfaces 26, 30 as slight relative rotation between the outer race member 12 and inner race member 14 occurs. This brings the high point of curved surface 26 directly between the inner and outer raceways 18, 20, creating a higher effective height of the sprag 22, and effecting a wedging action producing the normal locked or drive condition shown in FIG. 2.

Figure 10:
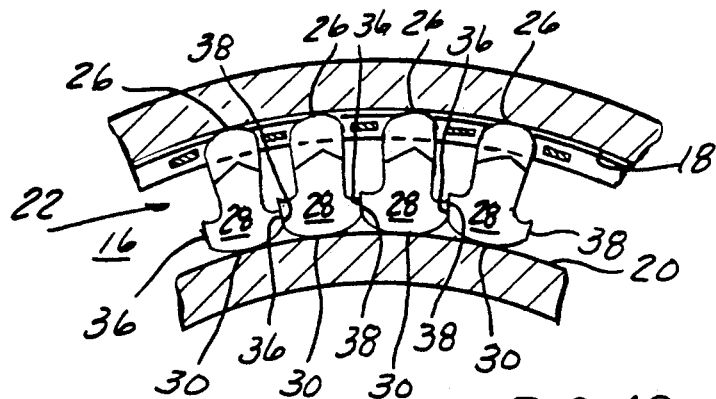
FIG. 10 is a sectional view of the sprag clutch taken along the same section line 6—6 of FIG. 5, but showing the overloaded locked condition of FIG. 9.
Figure 4:
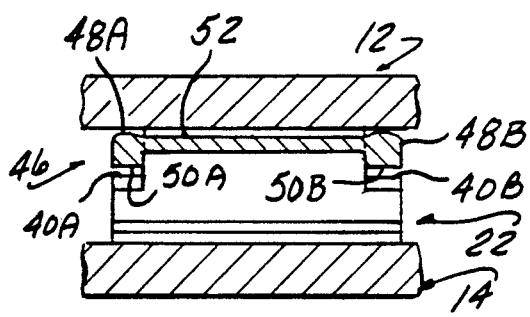
FIG. 4 is a transverse sectional view taken through the sprag clutch shown in FIG. 2, taken intermediate the individual sprags, along the section line 4-4 in FIG. 6.
Figure 5:
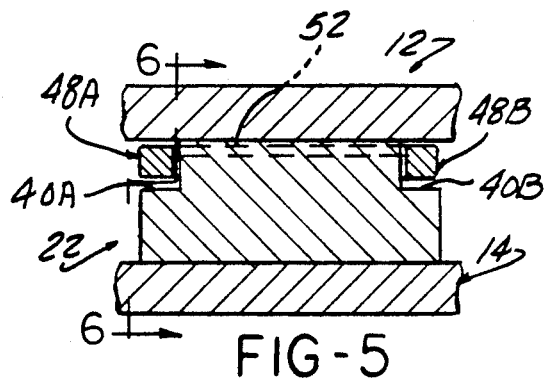
FIG. 5 is a transverse sectional view through the sprag clutch shown in FIG. 2, taken directly through an individual sprag, along the section line 5-5 shown in FIG. 6.
Figure 9:
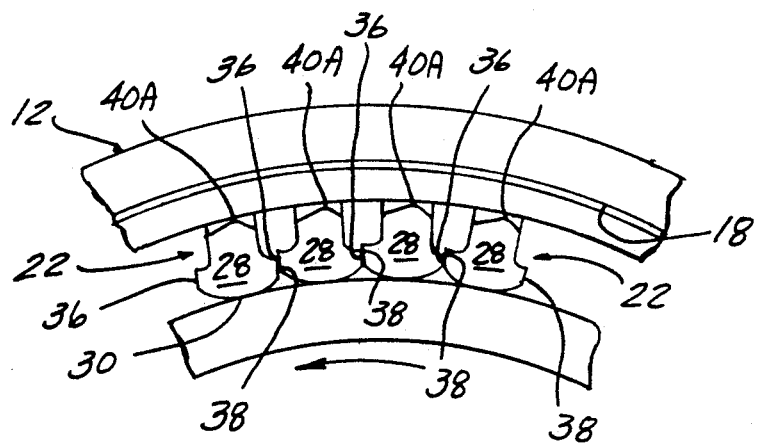
FIG. 9 is a fragmentary endwise view of the sprag clutch according to the invention with the sprags in the overloaded, locked up condition.

If excessive overload torques are applied, the sprags 22 continue to roll about the curved surfaces 26, 30 until the adjacent opposite abutment surfaces 36, 38 of each lip 32, 34 of the rocker portion 28 of each sprag 22 move into abutment as shown in FIGS. 9 and 10.

Such abutment creates a solid loading through the entire series of sprags, effectively preventing further tilting of the sprags 22 past the upright wedged position shown in FIGS. 9 and 10.

Figure 11:
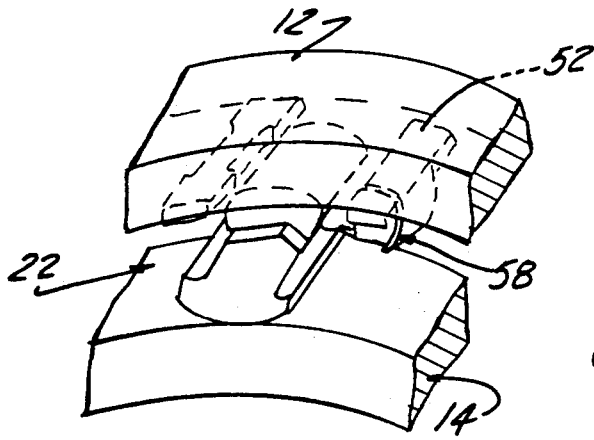
FIG. 11 is a fragmentary perspective view of a sprag clutch showing a representative single sprag according to the present invention, with a cage mounted, sprag energizing leaf spring.

As will be understood by those skilled in the art, the sprags 22 should be biased into engagement, and this can be accomplished by providing leaf springs 58 mounted to each bar 52 of the cage 46, urging a respective sprag 22 to the engaged position as shown in FIG. 11.

Figure 12:
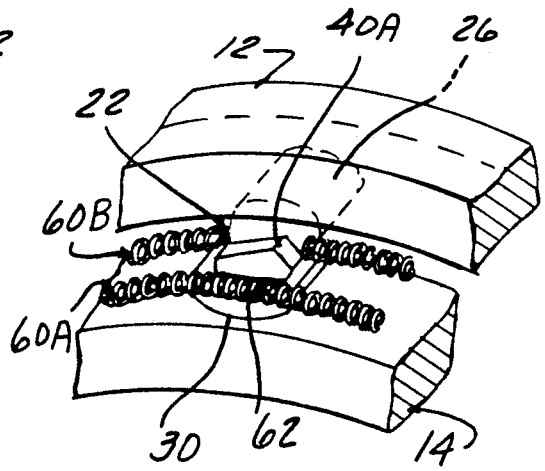
FIG. 12 a fragmentary perspective view of a sprag clutch according to the present invention, a single representative sprag shown, with an encircling pair of energizing garter springs installed.

Alternatively, the sprags 22 may be urged radially by compressed garter springs 60A, 60B, extending in respective relieved areas 62A, 62B under each knife edge feature 40A, 40B, as shown in FIGS. 12, 14, 15.

FIGS. 14 and 15 illustrates that the geometry of the top of each relieved area 62A, 62B presents an angled surface 63 such that the springs 60A, 60B exert a moment tending to tilt the sprags 22 into engagement. Surfaces 63 are preferably undercut as shown in FIG. 14 to retain the garter springs 60A, 60B therein.

FIGS. 16 and 17 show another option in which a single stretched garter spring 64 is located in a central slot 66 formed in the top of each sprag 22. The geometry of the slot 66 creates an angled surface 67 such that the garter spring 64 tends to tilt the sprags 22 into engagement.

It can be appreciated that the upright, narrow width shape of the sprags 22 allows a full complement to be disposed in the circumferential space 16, thus allowing a high capacity design while providing the centrifugal lift off function. Also, the antirollover feature is provided without increasing the complexity of the unit.

I claim:

1. A one way acting centrifugally released clutch of the type including an outer raceway, an inner raceway, with an annular space therebetween, a series of sprags substantially uniformly distributed in said annular space each sprag having an inner and an outer end adjacent to said inner and outer raceways respectively, each of said sprags inner and outer edges having respective curved surfaces shaped to reduce the effective height of each of said sprags by tilting of the sprags in one direction upon rotation of said inner raceway relative said outer raceway in one direction, to allow overrunning, and to increase the effective height of said sprags by tilting of the sprags in the other direction upon relative rotation of said inner raceway in the opposite direction to cause wedging of said sprags between said inner and outer raceways, means urging said sprags to be tilted away from said one direction to urge said sprags into contact with said inner and outer raceways, a retainer cage disposed in said annular space having spaced openings each receiving the outer end of one of said sprags, each of said sprags formed with at least one surface recessed radially, and at least one annular ring rotating with said inner raceway and having an inside diameter engaging said at least one radially recessed surface, means causing said retainer cage to be urged to rotate with said inner raceway, said outer curved surface of each of said sprags shaped to reduce the effective height of said sprags as to bring said outer ends out of engagement with said outer raceway by a predetermined degree of tilting in said one direction of tilt of sprags at a predetermined rotative speed of said inner raceway to produce disengagement therewith at said predetermined speed of said inner raceway, engagement of said at least one radially recessed surface of each sprag with said inside diameter of said annular ring restraining outward movement of said sprags at disengagement with said outer raceway, each of said sprags characterized by an upper portion having generally radially extending opposite sides extending to said outer curved surface, and said retainer cage spaced openings formed by space bars positioned on either side of the upper portions of each sprag, each of said sprags further having a bottom curved rocker portion formed on its inner end, each of said rocker portions having opposite circumferentially projecting leading and trailing lips, said rocker portion extending circumferentially to be substantially wider than the width of said upper portion, said lips asymmetrically shaped, with the leading lip having substantially greater mass than the trailing lip, so as to tend to case greater tilting of said sprags in said one direction of tilt of said sprags with greater rotative speed of said inner raceway.

2. The clutch according to claim 1 wherein said at least one radially recessed surface of each of said sprags comprises a knife edge feature projecting axially from one side of each of said sprags, said upper curved surface of each of said sprags being shaped to cause said knife edge feature to come into engagement with said inside diameter of said annular ring as said predetermined rotative speed of said inner raceway is approached.

3. The clutch according to claim 2 wherein said leading and trailing rocker lips each terminate in generally radially extending abutment surfaces facing the abutment surface of the next adjacent trailing or leading rocker lips, said facing abutment surfaces moving into abutment as said sprags move to an overloaded wedging condition to produce an antirollover effect.

4. The clutch according to claim 1 wherein said leading rocker lip of each sprag is thicker radially than said trailing lip to provide said unbalanced mass.

* * * * *